INVENTORS.
THOMAS M. GLEASON
HAROLD J. VARHANIK
EVERETT W. YOCKEY
BY

# United States Patent Office 3,206,232
Patented Sept. 14, 1965

3,206,232
TUBE FITTING
Thomas M. Gleason, Harold J. Varhanik, and Everett W. Yockey, Wichita, Kans., assignors to Boeing Airplane Company, Wichita, Kans., a corporation of Delaware
Filed Nov. 12, 1958, Ser. No. 773,486
5 Claims. (Cl. 285—161)

Our invention relates to a tube fitting mounted in an opening in a container wall and forming a seal with the wall. The fitting is particularly adapted for use in an aircraft integral fuel tank to facilitate inspection and replacement of the seals from the outside of the tank and without access to the interior. To achieve this purpose, interior means are provided to hold the fitting against rotation during tightening and loosening of the exterior nut.

In various liquid containers it is undesirable to obtain access to the interiors when replacing seals on lines passing through the container walls. This is particularly true with aircraft integral fuel tanks where access is difficult and involves the risk of damaging other tank seals. A requirement of holding a nut or a fitting with a wrench or the like on one side of a container wall during installation and seal replacement on the other side of the wall makes a two man operation and is often undesirable.

The objectives of our invention include: to provide an improved mounting and sealing fitting in an opening in a container, to devise an improved mounting and sealing fitting particularly adapted for use in aircraft integral fuel tanks, to provide a mounting and sealing fitting adapted for inspection and replacement of the seal without access to the interior of the tank and adapted for installation by one man, and to devise a mounting and sealing fitting having other desirable characteristics, particularly for use with aircraft integral fuel tanks.

Our invention will be best understood, together with additional objectives and advantages thereof, from the following description, read with reference to the drawings, in which.

Figure 3:
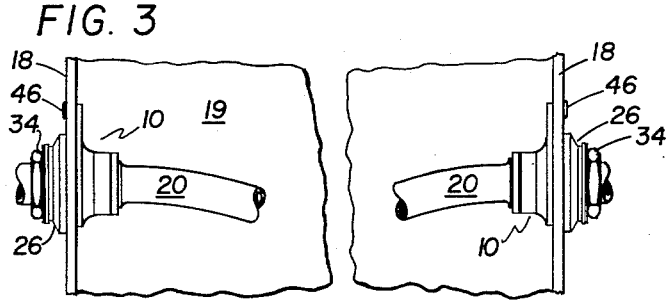
FIGURE 3 is a side view, in fragmentary form, of a line installed in openings in the two opposite bulkheads of the fuel tank.

A specific example of our invention is its use in aircraft integral fuel cells through which lines must pass for hydraulic fluids, fuel and other fluids. FIGURE 3 shows opposite bulkheads or walls 18 of a fuel cell or tank 19. Fluid line 20 extends through openings 16 in bulkheads 18. A fitting 10 is used in each opening 16. This fitting provides for the coupling to other lines outside of the fuel tank, as is often desirable in aircraft tanks and other applications.

Figure 1:
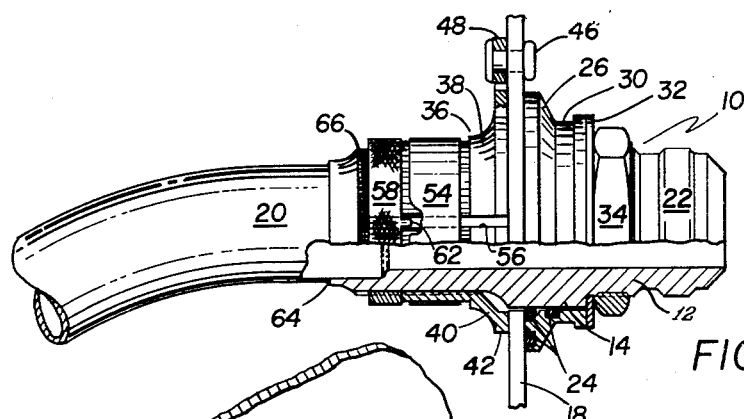
FIGURE 1 is a side view, partly in section, of a specific embodiment of our tube fitting shown installed in an opening of a fuel tank bulkhead.
Figure 2:
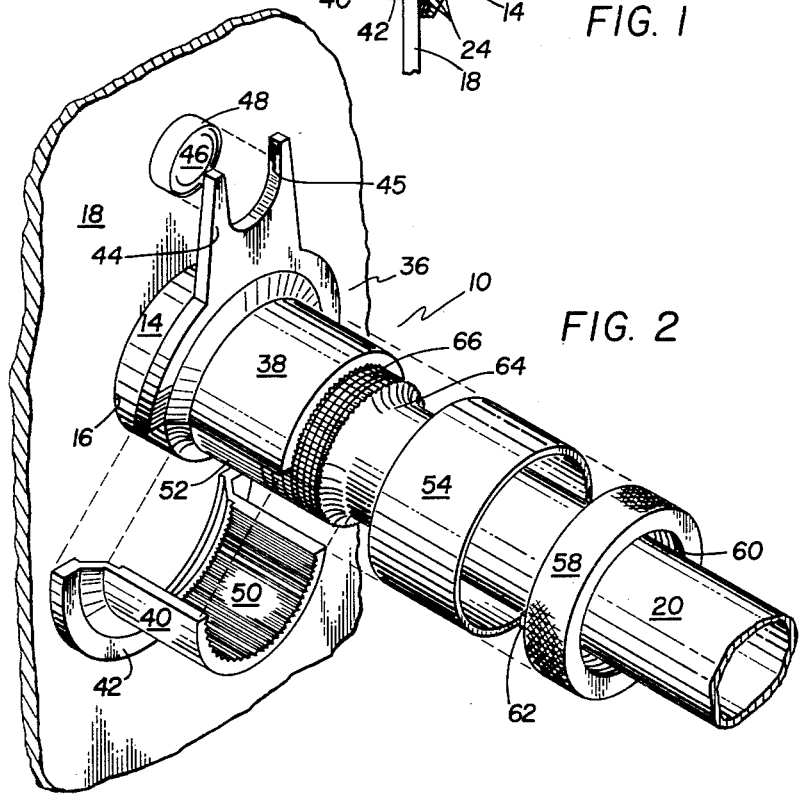
FIGURE 2 is an enlarged perspective view, partly in exploded form, viewed from the interior of the tank.

FIGURES 1 and 2 show a hollow, tubular fitting body 12 extending through opening 16 in bulkhead 18. The fitting body is of a size to pass completely through the opening. Coupling means 22 for a standard B coupling nut for coupling fitting 10 to a fluid line outside of the tank are shown on the outer side of bulkhead 18. A seal is provided between fitting body 12 and wall 18 preferably on the outer side of the bulkhead. A flanged retainer ring 26 is shown having standard O-ring seals 24 effecting a seal between fitting body 12 and ring 26 and between wall 18 and ring 26. Retainer ring 26 has a peripheral groove 30 which may be used for removal of ring 26 from the fitting cylindrical surface 14 by the use of a gear puller or other similar device. A washer 32 and a nut 34 press seal retainer ring 26 against bulkhead 18 thereby effecting the seal.

On the inner side of bulkhead 18, within tank 19 is a restraining member formed as a collar 36 which is preferably split into segments 38 and 40. Collar 36 has a flange 42 for abutment with the inner surface of the bulkhead. Collar segment 38 has an arm 44 having a forked end 45 extending normally from flange 42. A cylindrical abutment 48 is secured to bulkhead 18 by a rivet 46 and engages in forked end 45 of arm 44 thus preventing rotation of collar 36 relative to bulkhead 18.

The inner surface of collar 36 has longitudinal serrations 50 for securing the collar 36 in a selected angular position relative to fitting body 12 by engagement with mating longitudinal serrations 52 on fitting body 12. The word *serration* is used in the specification and claims as being inclusive of splines, although the less expensive and narrower toothed serrations would normally be used. Only the collar segment 38 having the forked arm 44 has to be serrated, but for economy and simplicity in machining it is preferable to serrate both segments. Fitting body 12 is thus prevented from rotating when the nut 34 is being tightened or loosened on the outer portion of the fitting by the engagement of serrations 52 with collar serrations 50 and by the engagement of abutment 48 by collar arm 44. If the fluid line 20 has bends in it, which is commonly the case in aircraft use, the tubing is restrained against rotating from its original position due to its own weight and the weight of the transmitted fluid disposed at one side of the fitting axis. The securing of the fitting against rotation prevents stresses being induced in tubing 20 as a result of torque applied to the outer ends when tightening nut 34. The serrations 52 on fitting body 12 are somewhat longer than the serrated portion 50 of split collar 36 thus allowing linear adjustability of fitting body 12 relative to bulkhead 18.

As shown in FIGURE 1, the arc length of each collar segment 38, 40 is slightly less than 180°. When collar 36 is in engagement with fitting body 12, the ends of collar segments 38, 40 are spaced forming two diametrically opposed recesses 56 for the purpose of locking nut 58, as hereafter will be described. Collar segments 38, 40 should be installed with approximately the same gap on each side.

The inter-engagement of serrations 50, 52, particularly at the edges of collar segment 38, act to retain collar segment 38 in place on fitting body 12. Dependent on the size of fluid line 20, torque to an amount of approximately 400 inch-lbs. may be applied in tightening nut 34 and the torque application tends to roll fitting body 12 out of collar segment 38. Because of machining tolerances, there is some play between the interlocking serrations of segment 38 and fitting body 12. During the tightening of nut 34, collar segment 38 may be separated from the fitting body 12 either by slight distortion of segment 38 or possibly by stripping of the serration crests. To prevent this possible occurrence, preferably a close fitting sleeve 54 is slipped over collar segments 38 and 40 whereby the stresses induced from the torquing of nut 34 will be distributed over the entire fitting body serrations and the collar segments will be held in place.

Threads 66 are superimposed on a portion of the serrations 52 of fitting body 12 for threaded engagement with threads 60 of a locknut 58. Locknut 58 is knurled on the peripheral surface for gripping between the fingers as a wrench is not used on this nut in the preferred form of the invention. The locknut is of a diameter preventing displacement of collar 36 and retaining sleeve 54.

Locknut 58 has two lugs 62 diametrically opposite each other on the face of the locknut abutting collar 36. Lugs 62, when positioned in recesses 56 between the ends of collar segments 38, 40, prevent rotational movement of the locknut.

The installation of tubing 20 and the securing of fittings 10 in openings 16 of bulkheads 18 is partly illustrated in FIGURES 2 and 3. Two locknuts 58 and two retaining sleeves 54 are placed on a suitable length of tubing 20 with the locknuts on the inside and directed with lugs 62 toward the outside. Sleeves 54 and locknuts 58 are positioned on tube 20 as described above prior to welding or brazing the ends of the tube to the ends of fitting bodies 12 as at 64. Locknut 58 usually cannot pass the threaded portion of the fitting and, in the structure shown in the drawing, sleeve 54 will not pass enlarged cylindrical portion 14 of fitting body 12. Opening 16 is of a size to pass fitting body 12, sleeve 54, and locknut 58.

One end of tubing 20 is inserted from the outside of the tank through opening 16 in a first bulkhead into the tank or compartment and is passed on through the identical opening 16 in the opposite bulkhead, as from the right to left in FIGURE 3. Collar segments 38 and 40 are now slid into interlocking engagement with the longitudinal serrations 52 of fitting bodies 12. Each collar is positioned so that forked end 45 of arm 44 is engaged with abutment pin 48. Collar segments 38 and 40 are installed with the recesses 56 on each side approximately equal. Sleeves 54 are then placed over collars 36. The cylindrical portions 14 of fitting bodies 12 are positioned relative to bulkheads 18 whereby O-ring seals 24 will be in sealing engagement with cylindrical portions 14. Locknuts 58 are threaded into engagement with collar 36. Lugs 62 of locknuts 58 may be positioned in recesses 56 by springing of bulkheads 18 or by distortion of line 20, providing it has a bend. The lugs may be oriented in line with recesses 56 and they will be pressed in place when outer nuts 34 are tightened on the outer sides of bulkheads 18.

After installation, fitting bodies 12 are restrained against rotation by collars 36 which are held against rotation by the engagement of arms 44 with abutments 48. When it is desirable to inspect or replace seals 24, nuts 34 may be removed without access to tank 19 because the fitting is secured against rotation. In most prior installations, the tank would have been entered to apply a wrench to hold the inner nut or the like against rotation.

Having thus specifically described our invention, we do not wish to be understood as limiting ourselves to the precive details of construction shown, but instead wish to cover those modifications thereof which will occur to those skilled in the art from our disclosure and which fall within the scope of our invention, as described in the following claims.

We claim:
1. Means sealing between a wall of an enclosure and a hollow, tubular fitting body disposed in an opening in said wall and said body and all of the sealing means integral therewith being of a size to pass through said opening, comprising: a collar of a size larger than said opening abutting a first side of said wall within said enclosure, said collar being split into two segments whereby said collar may be removed from said body and said collar having interior longitudinal serrations and said fitting body having longitudinal serrations interlocking against rotation with said collar serrations and permitting longitudinal adjustment of said collar, a fork-ended arm extending from one collar segment and an abutment secured to said wall and disposed in the fork of said arm, an annular sleeve encircling said collar segments to retain them in position. the ends of said collar segments being spaced forming a recess, a first nut threadedly engaged on said fitting body and having a lug fitting in said recess, the threads for said first nut on said fitting body being superimposed on at least a portion of the body serrations, said first nut being of larger diameter than said sleeve thereby forming an abutment preventing movement of said sleeve off said collar, said sleeve and said first nut being of a size to pass through said opening, a second nut threadedly engaged on said fitting body at the second side of said wall, and a sealing ring disposed on said fitting body between said second nut and said wall and having a pair of annular, resilient sealing rings, one ring effecting a seal with said fitting body and the other ring effecting a seal with said wall.

2. A tube fitting to be installed in an opening formed in a wall comprising,
   a tubular fitting body having longitudinal serrations formed in an external surface portion thereof and having helical threads formed in at least one end of said serrated surface portion,
   a collar on said body, said collar having longitudinal serrations formed in the inner surface thereof interlocking said collar against rotation with said serrations of said fitting body, said collar being slidable longitudinally for adjustment relative to said fitting body, said collar having a portion extending outwardly therefrom adapted to be connected to the wall for holding said collar against rotation,
   a first nut threadedly connected to said fitting body at one end of said serrated surface portion,
   a second nut threadedly connected to an opposite end of said fitting body, and
   annular sealing means encircling said fitting body between said second nut and said collar operable to effect a seal with said fitting body and with the wall for sealing the wall opening about the tube fitting when the same is installed in the opening and said first and second nuts are tightened.

3. A tube fitting as set forth in claim 2, wherein said annular sealing means comprises,
   a retainer ring having a longitudinally extending hub portion and a radially extending flange having one face adapted to face the wall, said retainer ring having a first O-ring groove formed internally of the hub thereof, said retainer ring having a second O-ring groove formed in said one face of said radially extending flange, said retainer ring having a third O-ring groove formed internally of said retainer ring hub and opening into said one face of said radially extending flange,
   a first O-ring disposed in said first groove and sealingly engaging said retainer ring and said fitting body,
   a second O-ring disposed in said second groove and sealingly engaging said retainer ring and the wall, and
   a third O-ring disposed in said third groove and sealingly engaging said retainer ring and said fitting body and the wall.

4. A tube fitting for being installed in an opening formed in a wall comprising,
   a fitting body having a serrated exterior surface portion,
   two segments forming a collar on said fitting body, said two segments having longitudinal serrations formed on the inner surfaces thereof adapted to engage and mesh with said serrated portion of said fitting body, said collar segments being longitudinally movable relative to said fitting body for adjustment relative to the wall, one of said collar segments having an outwardly extending arm connected thereto adapted to be fastened to the wall for securing said collar segments and said fitting body against rotation,
   an annular sleeve encircling said collar segments for holding the same in meshing engagement with said serrated portion of said fitting body, said collar segments each having an opposed end thereof spaced apart for forming a longitudinally extending recess therebetween,
   a first nut threaded onto one end of said fitting body and abutting said collar segments, said first nut having a lug extending into said recess for locking said first nut into position,
   a second nut threaded onto an opposite end of said fitting body, and
   a flanged retainer ring encircling said fitting body between said second nut and said fitting collar segments and adapted to be pressed against an opposite side of the wall by said second nut in opposition to said collar segments.

5. A tube fitting as set forth in claim 4, wherein said collar segments have radially extending flange sectors adapted to bear against the one side of the wall, and said outwardly extending arm of said one of said collar segments has a horseshoe-shaped outer end adapted to straddle a pin connected to the one side of the wall.

References Cited by the Examiner

UNITED STATES PATENTS

| 906,475 | 12/08 | Ullmann | 151—29 |
| 1,040,215 | 10/12 | Kriner | 151—8 |
| 1,513,516 | 10/24 | McCabe et al. | 285—204 |
| 1,637,365 | 8/27 | Wernle | 285—208 |
| 1,725,713 | 8/29 | Jobe | 285—419 |
| 1,822,637 | 9/31 | Young | 285—192 |
| 1,847,058 | 2/32 | Yanchenko | 285—192 |
| 1,913,222 | 6/33 | Von Glahn | 285—210 |
| 2,470,800 | 5/49 | Ashton. | |

FOREIGN PATENTS

| 141,020 | 12/20 | Great Britain. |
| 229,673 | 6/25 | Great Britain. |

CARL W. TOMLIN, *Primary Examiner.*

ARTHUR B. MILLER, HUNTER C. BOURNE, JR.,
*Examiners.*